(No Model.) 5 Sheets—Sheet 1.
F. A. WARREN.
BALE TIE MACHINE.

No. 392,245. Patented Nov. 6, 1888.

Witnesses:
Walter B. Nourse
Lucius W. Briggs

Inventor:
Fred A. Warren
By A. A. Barker, Att'y (No Model.)  5 Sheets—Sheet 2.

F. A. WARREN.
BALE TIE MACHINE.

No. 392,245.  Patented Nov. 6, 1888.

Witnesses:
Walter B. Arouse
Lucius W. Briggs

Inventor:
Fred. A. Warren
By A. A. Barker, Atty.

(No Model.)  5 Sheets—Sheet 3.

F. A. WARREN.
BALE TIE MACHINE.

No. 392,245.  Patented Nov. 6, 1888.

Witnesses:
Walter B. Nourse.
Lucius W. Briggs.

Inventor:
Fred. A. Warren.
By A. A. Barker, Atty.

(No Model.)  5 Sheets—Sheet 4.
F. A. WARREN.
BALE TIE MACHINE.
No. 392,245.  Patented Nov. 6, 1888.
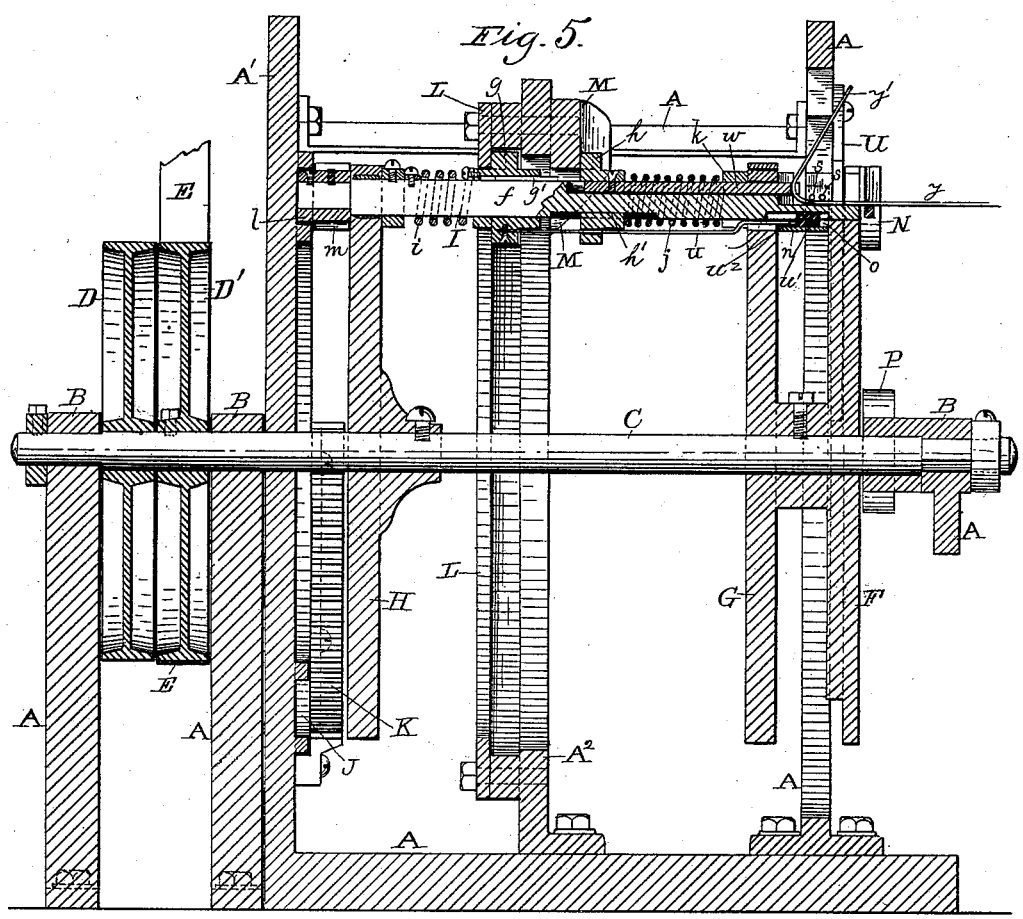
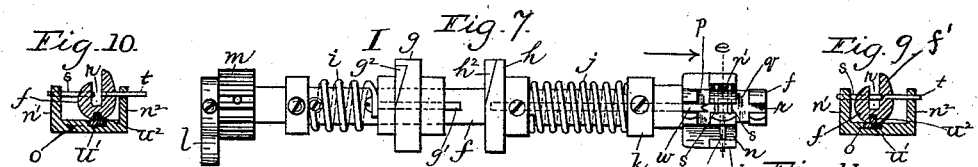
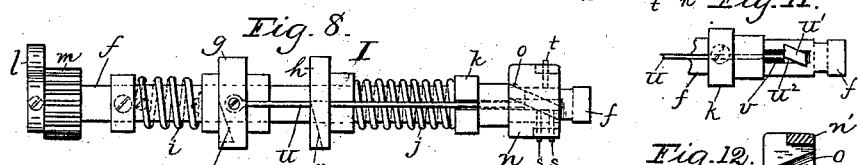
Witnesses:
Walter B. Nourse.
Lucius W. Briggs
Inventor:
Fred. A. Warren.
By A. A. Barker, Att'y.

(No Model.)

F. A. WARREN.
BALE TIE MACHINE.

No. 392,245. Patented Nov. 6, 1888.

Witnesses:
Walter B. Nourse
Lucius W. Briggs

Inventor:
Fred. A. Warren
By A. A. Barker, Att'y

UNITED STATES PATENT OFFICE.

FRED A. WARREN, OF WORCESTER, MASSACHUSETTS.

BALE-TIE MACHINE.

SPECIFICATION forming part of Letters Patent No. 392,245, dated November 6, 1888.

Application filed May 18, 1888. Serial No. 274,263. (No model.)

*To all whom it may concern:*

Be it known that I, FRED A. WARREN, a citizen of the United States, residing at Worcester, in the county of Worcester and State of Massachusetts, have invented certain new and useful Improvements in Bale-Tie Machines; and I do hereby declare that the following is a full, clear, and exact description thereof, reference being had to the accompanying drawings, forming part of this specification, and in which—

Figure 1:
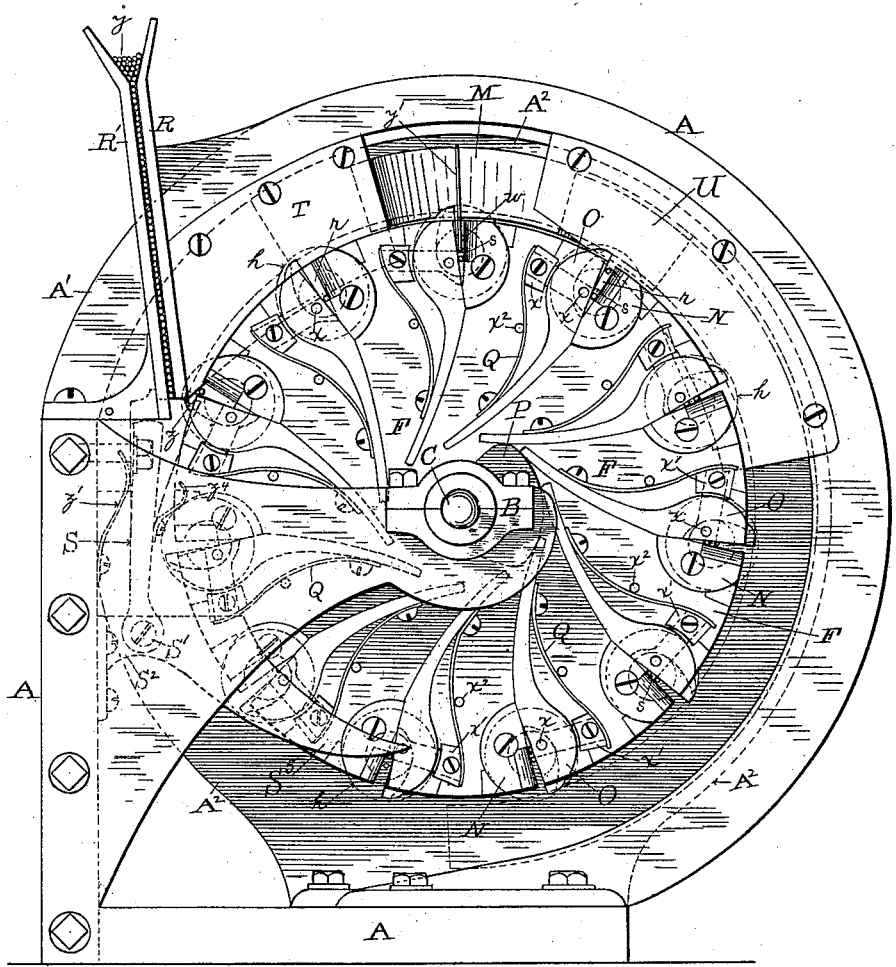
Figure 2:
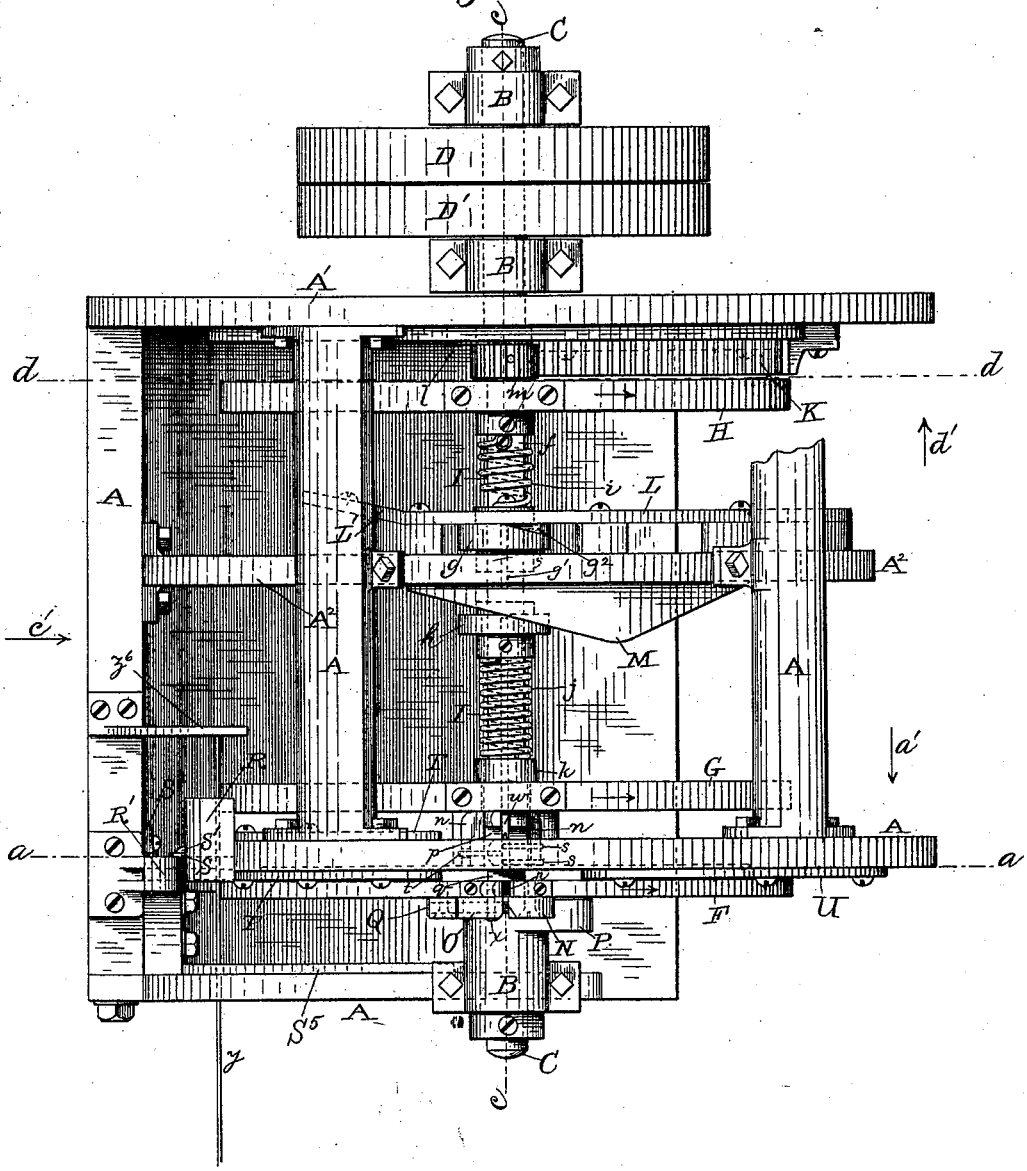
Figure 3:
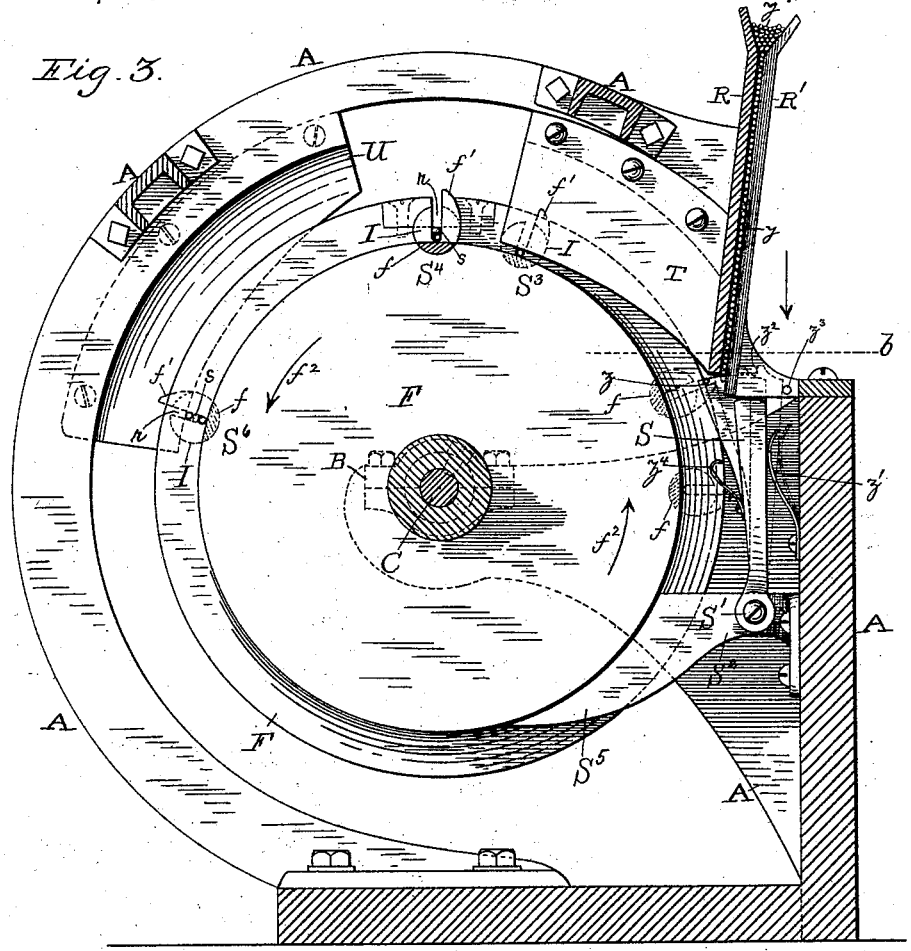
Figure 4:
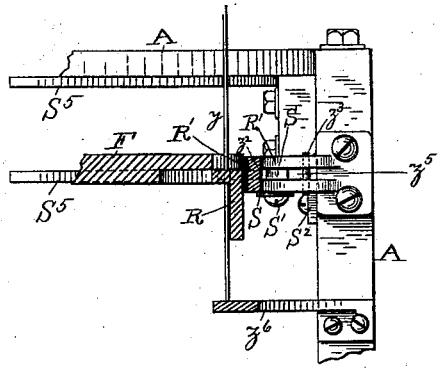
Figure 6:
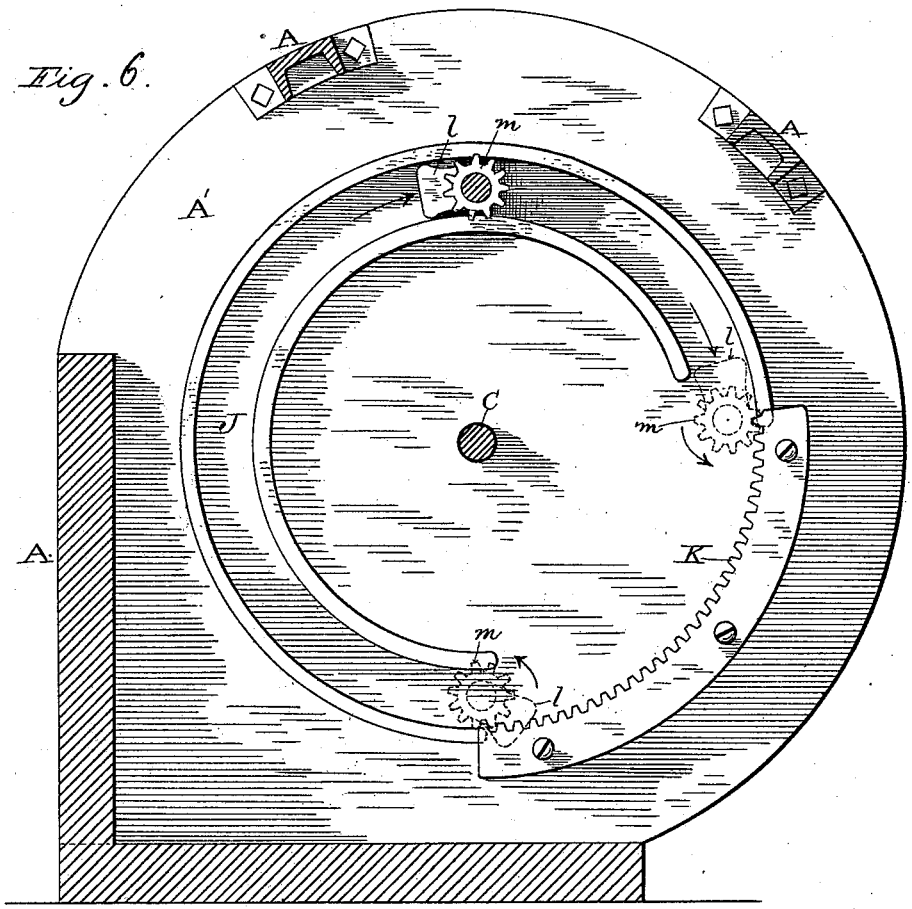
Figure 13:
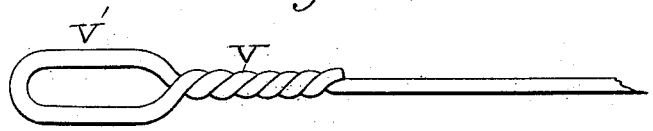

Figure 1 represents a front side view of my improved bale-tie machine. Fig. 2 is a top or plan view thereof, showing in this figure, as well as in all the following figures, only one of the wire bending and twisting devices, hereinafter more fully described. Fig. 3 is a vertical section on line *a a*, Fig. 2, looking in the direction of arrow *a'*, same figure. Fig. 4 is a horizontal section of a portion of the machine, taken at the point indicated by line *b*, Fig. 3, looking down, as shown by the arrow. Fig. 5 is a central vertical section taken on line *c c*, Fig. 2, looking in the direction of arrow *c'*. Fig. 6 is a vertical section taken on line *d d*, Fig. 2, looking in the direction of arrow *d'*. Fig. 7 is a top or plan view of one of the wire bending and twisting devices detached from the machine to more fully illustrate the construction thereof. Fig. 8 is an under or bottom view of said device. Figs. 9 and 10 are transverse sections on line *e*, Fig. 7, showing the parts in different positions, as and for the purpose hereinafter described. Figs. 11 and 12 are detached views of parts of said bending and twisting device, also hereinafter described; and Fig. 13 represents the manufactured end of a bale-tie as bent and twisted by my machine.

My invention relates more particularly to machines for making bale-ties having a single eye or loop at one end and whose other end is left plain.

The object of said invention is to simplify the construction and to materially increase the production of said machines; and it consists in the construction and arrangement of the various parts of the machine, whereby one tie after another may be made in rapid succession thereon by a continuous and automatic operation, said construction and arrangement being such as to admit of the production of several ties at each revolution of the main shaft, as hereinafter more fully set forth.

In the drawings, the parts A represent the frame-work of the machine, which is provided with suitable bearings, B B B, in which the main driving-shaft C is fitted to turn. Said shaft C is arranged horizontally and is provided at one end with the loose and tight pulleys D D'. Driving-power may be imparted from any suitable and convenient mechanism to said pulleys and shaft by means of an endless belt, E, passed around said pulleys, which may in practice be connected with said driving mechanism. As said driving mechanism constitutes no part of my invention, it is deemed unnecessary to describe or illustrate the same.

Upon the main driving shaft C are secured at right angles thereto the circular rotary disks F, G, and H, respectively, and upon said disks are mounted at the peripheries thereof a series of bending and twisting devices I,— eleven in this instance—said devices being arranged parallel to, equidistant from, and radially around the central shaft. The construction and arrangement of these bending and twisting devices, in connection with other parts coacting therewith, as hereinafter specified, constitute the essential feature of my invention. I will now proceed to describe the construction of one of these devices, the others being duplicates thereof.

Upon a central spindle or shaft, *f*, are fitted the hubs *g h*, each of which is arranged to turn with the spindle and also have longitudinal movements thereon, for the purpose hereinafter specified, being held from turning upon said spindle by means of the splines *g' h'*. The hub *g* has a tensional strain imparted to it in the direction toward the rear of the machine by means of a spiral spring, *i*, fitted over the spindle, one end of which is fastened to said hub *g* and its other end to the spindle, as is indicated in Figs. 5 and 7. The hub *h* has a pressure imparted to it toward the rear of the machine by means of a spring, *j*, fitted over the spindle and interposed between said hub *h* and a collar, *k*, secured to the spindle. To the rear end of spindle *f* at its extremity is secured a dog, *l*, and just inside of said dog is secured a pinion, *m*, for the purpose hereinafter described. At the opposite or forward end from said dog and pinion the spindle is provided with an adjustable wire-holding device, which is constructed and operated in the following manner: A slide, $n$, having two upwardly-projecting ears, $n'$ $n^2$, and also provided with an inclined slot, $o$, is arranged under the front end of the spindle. Said spindle at this end is slotted out transversely at the points indicated by $p$ and $q$, and is also provided with the longitudinal slot $r$. The ear $n'$ of slide $n$ is provided with two transverse pins, $s$ $s$, which are arranged to slide forward and back in suitable transverse openings in the spindle when the slide is operated, as hereinafter described. The purpose of these pins $s$ $s$ is to hold the wire upon its upper side in bending the same when said pins are forced forward across the longitudinal slot $r$, as indicated in Figs. 5, 7, and 9, the wire being passed under said pins, as shown in Fig. 5 and hereinafter more fully explained. The spindle is provided with a guide-pin, $t$, which fits in a transverse opening in the ear $n^2$ of slide $n$ and serves to guide said slide in its transverse movements. The slide is thus operated by the operation of the hub $g$, as hereinafter described, through the connecting-rod $u$, (see Fig. 8,) fastened at one end to said hub and extending forward and terminating at its forward extremity in the beveled head $u'$, which is fitted to slide in the inclined slot $o$, previously referred to. Said head is also provided with a longitudinal flange, $u^2$, which fits in a longitudinal slot, $v$, formed in the spindle, as best shown in Figs. 9, 10, and 11. By this construction it is obvious that the head, being held against transverse movement in sliding forward and back in the slot in the spindle, causes the slide $n$ to be moved transversely in one direction or the other as the inclined portion of the head $u'$ is slid forward or back in the inclined slot $o$ of said slide, thus causing the pins $s$ $s$ to be moved across the longitudinal slot $r$ in the spindle or withdrawn therefrom, according to which way the head is moved in said inclined slot $o$ of the slide $n$.

Having described the manner of holding the wire preparatory to bending the same, I will now describe how said bending operation is performed.

In a longitudinal slot in the spindle on the opposite side from the rod $u$ is fitted a flat strip, $w$, fastened at one end to the hub $h$ and adapted to be operated thereby when said hub is operated, as hereinafter described. The forward end of said flat strip is preferably made fork-shaped, as indicated in Fig. 7, so as to fit over and hold against the wire in bending the same, as indicated in Fig. 5. The rear frame, $A'$, is provided upon its inner side with a guide-slot, J, and also with a segment-gear, K, (see Fig. 6,) the guide-slot occupying in this instance about three-fourths of the circumference of a circle and the segment-gear the other fourth. The purpose of said guide-slot and segment-gear will be described later. To the central frame, $A^2$, is secured a guide-flange, L, against which the hub $g$ operates when the machine is in operation, said guide-flange being inclined at $L'$ (see Fig. 2) to impart the desired cam motion to the hub $g$ in operating the slide $n$, as previously described. The hub $h$ is operated by means of the cam M, also secured to the central frame, $A^2$.

Subsequent to the bending operation and just prior to that of twisting the wire said wire is held firmly between the jaws N O, arranged upon the outer face of the rotary disk F. The jaw N is rigidly secured to said disk, while the jaw O is hinged at $x$ and is provided with an arm extending toward the center of the machine and adapted to be operated upon by the stationary cam P, arranged between disk F and the front bearing, B, when the machine is in operation. A constant pressure is exerted upon each arm to keep the jaws open, except when closed by coming against the cam, by means of a suitable spring, Q, which in this instance is secured at one end near the inner end of the arm. It bears at its outer end against a fixed bearing, $x'$, and midway between its two ends against a fixed pin, $x^2$. Any equivalent spring device may be used in lieu thereof, if desired. It will be understood that these jaws are arranged in line with the bending and twisting devices I, previously described, and that eleven sets of jaws are in this instance shown, to correspond with the number of said bending and twisting devices. Said jaws, it will be understood, are closed by the cam P only during the operation of twisting the wire after the loop has been formed, as hereinafter described.

The blank wires $y$, from which the ties are made, may be fed into the machine in a variety of ways, and I therefore do not limit myself to the particular method shown, and which I will now describe.

To the frame A are secured in any convenient manner the upright standards R R', arranged at just sufficient distance apart to allow the wires to pass down between them, and thus acting as a guide-trough for automatically guiding the wires into the machine. In order that a large number of wires may be contained therein, the upper end of the trough may be made flaring or tunnel shape, as shown in Figs. 1 and 3. It will be understood that said wires are laid in the trough horizontally. The wires are fed individually into each bending and twisting device as it is moved in line therewith in the following manner: An arm, S, is hinged at S' to a stationary bearing, $S^2$. The upper end of said arm swings just under the lower end of the trough which contains the wires and holds them from slipping down out of said trough except when a notch, $z$, formed in its upper edge, near its forward end, is brought under and in line with the trough. Upon said notch being moved under the line of wires, one of said wires is allowed to drop into said notch, and when the arm is moved forward the wire is carried forward with it in the notch, as indicated in Fig. 3. A constant pressure is exerted to force the arm toward the machine by means of a suitable spring, $z'$, in this instance interposed between said arm and frame A. The forward and backward movements of the arm may be controlled by the shoulder $z^2$ thereof striking the outer side of the standard R' and by the back of said arm coming against a stationary pin, $z^3$, as is indicated by full and dotted lines in Fig. 3.

The operation of moving back the arm, catching one of the wires, and carrying it forward, as aforesaid, is performed by a projecting flange, $f'$, on the spindle $f$ coming against and forcing the arm back, and as it passes by and allows said arm to spring back said flange $f'$, coming against the wire, as indicated by dotted lines in Fig. 3, lifts said wire from the notch in the arm and forces it forward, and as it is continued to be carried forward by the flange the wire comes in contact with the lower edge of stationary guide-plates T T, which are curved in such a manner (see Figs. 1 and 3) as to force down the wire into the bottom of the longitudinal slot $r$ in the spindle $f$, as indicated at $S^3$ in Fig. 3. At this point in the operation the pins $s\,s$ are moved forward over the wire, as is indicated at $S^4$. In practice it is preferable to secure a small spring, $z^4$, upon the front side of the arm S for the flange $f'$ on the spindle $f$ to strike against in forcing back said arm to obtain a wire, as previously described. It will be understood that the arm is so constructed in practice as to allow the flange $f'$ to pass up at one side of the part of said arm in which the notch $z$ is formed. The upper end of the arm in this instance is fitted to work back and forth in a vertical slot, $z^5$, formed in the base of the standard R'. The blank wires $y$ may all be fed in the proper distance to form the loop against a suitable stationary gage, $z^6$. After the wire has been bent over the pins $s\,s$ by the forked bender $w$, as previously described, and as the said wire is continued to be carried round in the device I, the bent end $y'$ comes in contact with the bottom or inner edge of a guide-plate, U, which in practice is so formed as to still further bend down the wire, so that said outer end, $y'$, which has been bent over, will be parallel with the main strip. At this point in the operation the jaws grip the wire, and as it passes beyond the limit of the guide-plates U the pinion $m$ enters into mesh with the segment-gear K, thus causing the spindle to be rotated, and in consequence twisting the wire next to the loop, as indicated at V in Fig. 13. Immediately upon the completion of said twisting operation the pins $s\,s$ are withdrawn from the slot in the spindle in the manner before specified and the jaws opened, thus allowing the completed tie to drop out of the machine. To facilitate said discharging operation, the discharging-plates $S^5$ $S^5$ are arranged in the proper positions for the tie to strike against their under edges, and thus positively insuring the discharge thereof. In this instance one of the discharging-plates $S^5$ is shown as a continuation of the stationary bearing $S^2$, previously referred to.

The purpose of the dog $l$ on the rear end of spindle $f$ is to insure the pinion always entering into mesh properly with the segment-gear K as said pinion travels around its circuit and comes in contact with the said gear, the dog at the completion of the twisting operation passing into the guide slot J and following around therein until it leaves the slot and enters into mesh with the gear K, as aforesaid.

Although I have shown and described two of the guide and discharging plates T $S^5$, only one of each may be used, if preferred.

Having now described in detail the various parts of the machine, the operation thereof may be briefly summed up as follows: In describing the operation of the machine I will take one of the devices I and carry it through its different stages through said machine, from the operation of discharging one of the wires into the notch $z$, then carrying said wire through the machine to bend and twist the same, and discharging it a completed tie, all by a continuous and automatic operation, the operation of each device I being the same, and one following in rapid succession after the other in the operation of the machine. Assuming that the arm S is in its forward or normal position, as the spindle $f$ moves forward in the direction shown by the arrows $f^2$ in Fig. 3 the flange $f'$ of said spindle, coming in contact with the spring $z^4$, forces said arm back against its pin $z^3$, as shown by dotted lines in said Fig. 3, thus bringing its notch $z$ under the line of wires $y$ and allowing one of said wires to drop into the notch, and immediately upon the flange passing by the spring $z^4$ the arm is sprung forward again by its spring $z'$, thereby carrying the wire with it in its notch, and as the flange $f'$ continues to move forward at one side of the arm it lifts the wire from the notch and carries it forward against the under edges of the guide-plates T. Then as the wire is continued to be pushed forward it is forced down by said guide-plates into the bottom of the longitudinal slot $r$ in the spindle $f$, as indicated at $S^3$ in Fig. 3. (It will be understood that the edge of disk F is slotted out in continuation of the slots $r$ in the spindles.) The wire having been forced down into the bottom of the slot in the spindle, the pins $s\,s$ are now moved forward over the wire, as shown at $S^4$ in Fig. 3 and in Fig. 5, to hold the same during the bending operation by the cut-away portion $g^2$ of hub $g$ coming against the inclined flange L L', and being forced back thereby to operate said pins, as previously described. Immediately following said operation of forcing the pins $s\,s$ forward the cut-away portion $h^2$ of hub $h$ arrives against the cam M, and said cam causes said hub to be pushed forward, thereby forcing forward the forked bending strip $w$, and in consequence bending the wire forward, as indicated in Fig. 5. It is thus bent over and down a sufficient distance for the end $y'$ of the wire to come under the lower inner edge of the guide- plate U as the spindle is carried forward by the rotation of its supporting-disks. The wire continuing to be moved forward, said plate U forces said end y' of the wire down against the pins s s, as indicated at S⁶ in Fig. 3, thus completing the loop V'. (Shown in Fig. 13.) Up to this point in the operation the spindle f has simply rotated with the main shaft and has had no independent rotary motion in its bearings, the dog l on the rear end of the spindle having been all this time traveling in its guide-slot J, thus holding the spindle against independent rotary motion. The jaws N O have also during the foregoing operation occupied their normal or open positions; but just prior to the spindle passing beyond the limit of the guide-plate U the arm of the jaw O, coacting with the spindle in question, arrives against the stationary cam P, which causes the jaws to be closed, thus clamping the wire between them preparatory to the twisting operation. Immediately upon the wire being clamped in the jaws, as aforesaid, the pinion m enters into mesh with the segment-gear K, as indicated by dotted lines in Fig. 6, and the dog l passes out of and beyond the limits of its guide-slot J, thereby permitting the spindle to rotate as it is moved along in mesh with the segment-gear, and in consequence causing the twist V (see Fig. 13) to be made in the wire, and thus completing the tie. Upon the arrival of the spindle at the end of the segment-gear the arm of the jaw passes out of action with its cam, thus allowing the jaws to open, and the pins s s are now also drawn back, as previously described, thereby permitting the completed tie to drop out of the machine; and to facilitate said discharging operation the discharging-plates S⁵ S⁵ are arranged at the proper places to insure said discharge upon the release of the wire by the jaws, as previously described. Upon the discharge of the completed tie, as aforesaid, the dog l passes into its guide-slot J again, when the operation is repeated, and so on continuously for each successive tie made by the machine.

From the foregoing description it will at once be apparent to those skilled in the art to which this invention appertains that the class of bale-ties herein shown and specified may be manufactured in a very rapid manner, there being no loss of time by back motion and the process of manufacture being by a continuous rotation of the main shaft and parts mounted thereon.

It will be understood that I do not limit myself to the particular construction and arrangement shown and described, nor to the number of devices I, shown in the drawings, said number being increased or decreased, as desired and deemed advisable under different circumstances.

What I claim as new, and desire to secure by Letters Patent, is—

1. In a bale-tie machine, the series of bending and twisting devices I, arranged parallel to the main driving-shaft C, equidistant therefrom, and constructed substantially as described, in combination with the inclined flange L L', the cam M, guide-slot J, segment-gear K, said central shaft, C, rotary supporting-disks F, G, and H, or their equivalents, having suitable bearings for the devices I to turn in, guide-plates T and U, discharge-plate S⁵, clamping-jaws N O, springs Q, cam P on the main driving-shaft, means, substantially as described, for feeding the blank wires to each device I as it comes in line therewith, and the supporting frame-work, all constructed and arranged substantially as set forth and shown.

2. In a bale-tie machine, the combination of the stationary inclined flange L L' with hub g on spindle f, said spindle f fitted to turn in suitable bearings having in turn a rotary motion with the main driving-shaft, spring i, rod u, fastened at one end to hub g and at its opposite end provided with a head, u', fitted to slide longitudinally in a longitudinal slot in the spindle f, and also made beveling on one side and fitted to slide in an inclined slot, o, in a slide, n, said slide n having the ears n' n². transverse pins s s, fastened in ear n' and fitted to slide forward and back in suitable transverse openings in spindle f, across a longitudinal slot, r, in said spindle, and guide-pin t, fastened transversely in the spindle and fitted in a suitable guide-opening in ear n², substantially as and for the purpose set forth.

3. In a bale-tie machine, the combination of cam M with hub h on spindle f, said spindle f fitted to turn in suitable bearings having in turn a rotary motion with the main driving-shaft, spring j, and strip w, fitted to slide longitudinally in a suitable slot in the spindle, fastened at one end to the hub h, and at its opposite end made fork-shaped to fit over the wire, substantially as and for the purpose set forth.

4. In a bale-tie machine, the combination of the rotating spindles f and their rotary supports with the clamping-jaws N O on the rotary disk F, jaws N being rigidly fastened to said disk and jaws O hinged thereto, and each jaw O provided with an inwardly-projecting arm adapted to engage with a stationary cam, P, fastened to frame A, said cam P, and springs Q, for exerting a pressure against the arms on jaws O to hold said jaws open except when closed by the cam, substantially as and for the purpose set forth.

5. In a bale-tie machine, the combination of the series of devices I, arranged parallel to and equidistant from the main driving-shaft, constructed substantially as described, and fitted to turn in suitable bearings in turn having a rotary motion with the main driving-shaft, with the inclined flange L L', cam M, clamping-jaws N O, springs Q, cam P, guide-slot J, and segment-gear K, substantially as and for the purpose set forth.

6. In a bale-tie machine, the rotary spindle f, provided with the dog l and pinion m at one end and at its opposite end having the wire-holding device, consisting of the laterally-operating slide n, provided with the transverse holding-pins s s, adapted to be passed over the wire preparatory to said wire being bent, in combination with the rear frame, A', provided with the guide-slot J and segment-gear K, substantially as and for the purpose set forth.

7. In a bale-tie machine, the rotary spindle $f$, provided with the pinion m at one end and at its opposite end having the wire-holding device, consisting of the laterally-operating slide n, provided with the transverse holding-pins s s, adapted to be passed over the wire preparatory to said wire being bent, in combination with the rear frame, A', provided with the segment-gear K, substantially as and for the purpose set forth.

8. In a bale-tie machine, the combination of the series of rotating devices I, arranged parallel to and equidistant from the main driving-shaft, their supports, and disk F, with the guide-plates T U and discharge-plates $S^5$, substantially as and for the purpose set forth.

9. In a bale-tie machine, the combination of the rotary spindle $f$, having the laterally-projecting flange $f'$ thereon, the supports thereof, and rotary disk F, with the standards R R', arranged in the proper position and at the proper distance apart to form a guide slot or trough for the wires, the hinged arm S, whose upper end swings just under the exit of said guide-trough and is provided with a notch in its upper edge, near the front end thereof, to receive one wire at a time, a suitable spring, $z'$, for exerting a constant forward pressure thereon, and a suitable gage, $z^6$, the arm being provided with means for controlling its forward and backward movements, substantially as and for the purpose set forth.

10. In a bale-tie machine, the hinged arm S, having the spring $z^4$ on the front side thereof and a suitable spring for exerting a constant forward pressure thereon, also being provided with a notch in its upper edge, near the front end thereof, capable of holding one wire at a time, and with means for controlling its forward and backward movements, and means for supplying the wires automatically to said notch when the latter is brought in line with said wires, in combination with the rotary spindle $f$, having the flange $f'$, the supports thereof, and rotary disk F, substantially as and for the purpose set forth.

11. In a bale-tie machine, the hinged arm S, having the spring $z^4$ on the front side thereof and a suitable spring for exerting a constant forward pressure thereon, also being provided with a notch in its upper edge, near the front end thereof, capable of holding one wire at a time, and with means for controlling its forward and backward movements, and means, substantially as described, for supplying the wires automatically to said notch when the latter is brought in line with said wires, in combination with the rotary spindle $f$, having the flange $f'$, the supports thereof, the rotary disk F, and guide-plates T, substantially as and for the purpose set forth.

FRED A. WARREN.

Witnesses:
A. A. BARKER,
W. B. NOURSE.